United States Patent [19]
Cloutier

[11] Patent Number: 5,165,472
[45] Date of Patent: Nov. 24, 1992

[54] HEAT EXCHANGER WITH FLUID INJECTORS

[76] Inventor: Louis Cloutier, 484 Principale Nord, Richmond, Quebec, Canada, J0B 2H8

[21] Appl. No.: 671,105

[22] Filed: Mar. 18, 1991

[51] Int. Cl.⁵ .............................................. F28F 13/12
[52] U.S. Cl. .................... 165/159; 165/163; 137/597
[58] Field of Search ................ 165/70, 159, 163, 173; 122/13.1, 18, 31.1, 367.1; 137/597

[56] References Cited

U.S. PATENT DOCUMENTS

| | | | |
|---|---|---|---|
| 324,120 | 8/1885 | Kirkaldy | 165/163 |
| 2,126,552 | 8/1938 | Holloway | 165/163 X |
| 2,458,826 | 1/1949 | Blumberg et al. | 165/163 X |
| 2,485,689 | 10/1949 | Baumann | 165/163 X |
| 2,693,346 | 11/1954 | Petersen | 165/163 X |
| 3,882,693 | 5/1975 | Hiller | 165/70 X |
| 4,265,094 | 5/1981 | Haasis, Jr. | 165/163 X |
| 4,316,501 | 2/1982 | Bowden et al. | 165/70 |
| 4,643,212 | 2/1987 | Rothrock | 137/1 |

Primary Examiner—Allen J. Flanigan
Attorney, Agent, or Firm—Foley & Lardner

[57] ABSTRACT

Disclosed is an improved heat exchanger whose flow rate and heat exchange rate are so improved that it may quickly respond to any demand in a very efficient way. This heat exchanger comprises a tank in which a first fluid may be circulated, this tank having an inlet port and an outlet port for the first fluid, and at least one heat conductive tubular element located within the tank, and in which a second fluid may be circulated in order to exchange heat with the first fluid within the tank, this at least one heat conductive element having ends leading outside the tank. A fluid injector is operatively connected to at least on one of the ports of the tank to generate turbulences and prevent the formation of dead spots within the tank. This injector is preferably in the shape of a loop and provided with a plurality of perforations, the loop extending in a plane parallel to and near one end of the tank. Some of the perforations are oriented to generate a circulation of the first fluid in directions that are substantially perpendicular to the plane of the loop all along the length of the same. Some other perforations are oriented at angles to generate another circulation of the first fluid toward the center of the tank. The heat conductive tubular element preferably comprises a plurality of loops-defining coils mounted within the tank of the heat exchanger in such a manner that the loops of each coil fit between the loops of at least one other adjacent coil, all of the coils having ends joined together to form common ports. Such a coil arrangement makes the heat exchangner very compact yet efficient.

19 Claims, 4 Drawing Sheets

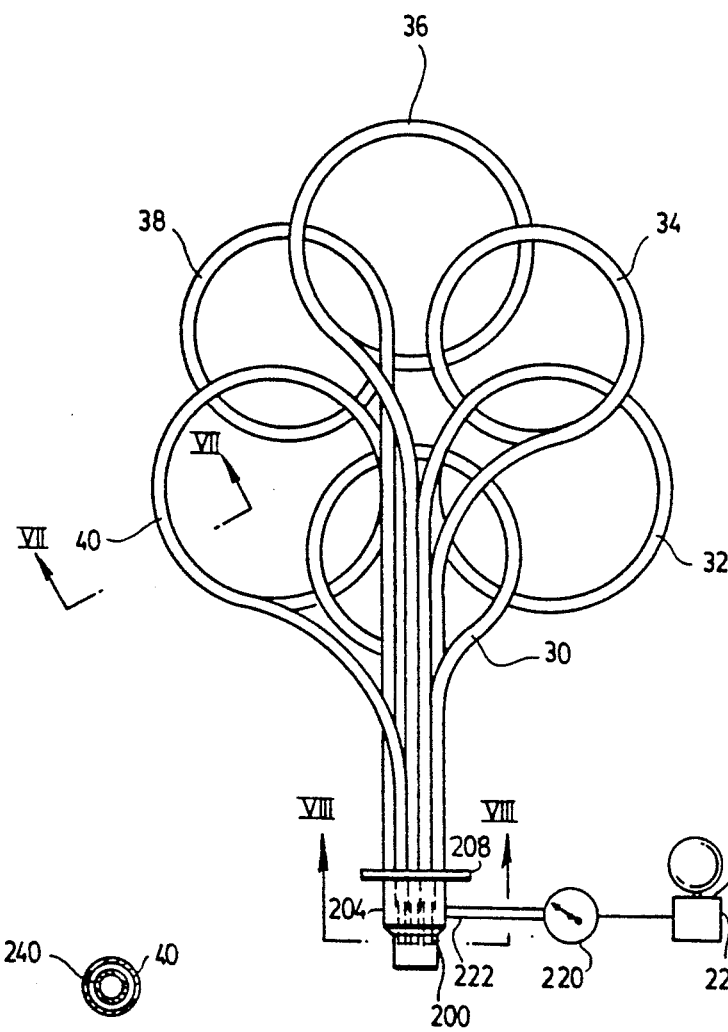
FIG. 4
FIG. 8
FIG. 7
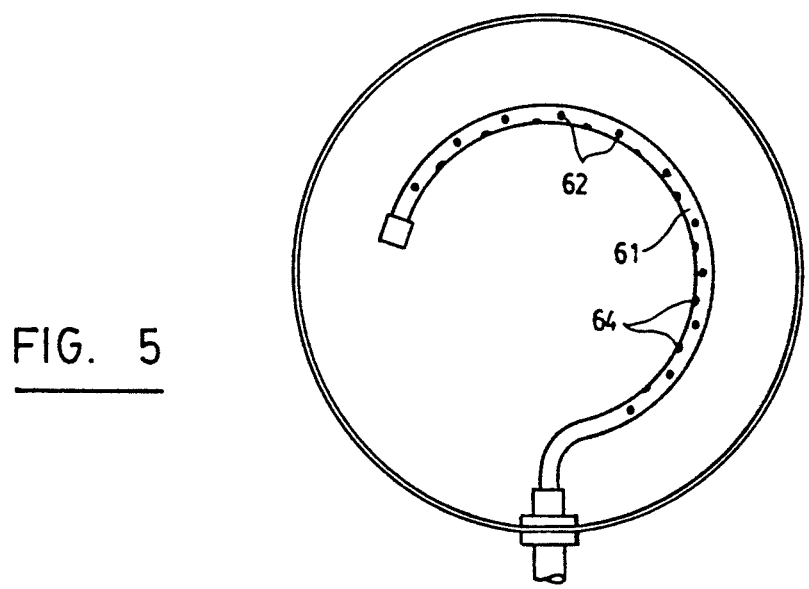
FIG. 5

HEAT EXCHANGER WITH FLUID INJECTORS

BACKGROUND OF THE INVENTION

1. Field of the invention

The present invention relates to an improved heat exchanger of the type comprising:
- a tank in which a first fluid may be circulated, this tank having an inlet port and an outlet port for the first fluid, and
- at least one heat conductive tubular element located within the tank, and in which a second fluid may be circulated in order to exchange heat with the first fluid within the tank, this at least one heat conductive element having ends leading outside the tank.

More particularly, the invention relates to a heat exchanger of the above mentioned type whose flow rate and heat exchange rate are so improved that it may quickly respond to any demand in a very efficient way.

2. Brief description of the related art

In most of the heat exchangers of the abovementioned type, the inlet and outlet ports of the tank are usually in the form of orifices or straight tubes opening into the tank. Such a structure does not permit the fluid fed to the tank to be equally distributed within the tank, thereby leading to the formation of temperature gradients, laminar flows and dead zones, hereinafter called "dead spots", where heat transfer is not or hardly accomplished. These dead spots reduce the efficiency of the heat exchanger and produces substantial temperature variations in the fluid output.

SUMMARY OF THE INVENTION

A first object of the present invention is to provide an improved heat exchanger wherein the first fluid is injected into the tank in such a manner as to increase turbulences, increase mixing, and eliminate dead spots within the tank, thereby increasing the heat exchange efficiency and rate.

Another object of the invention is to provide an improved heat exchanger of the above mentioned type, in which the heat conductive element in which the second fluid flows consists of a plurality of coils mounted and arranged in such a manner that the resulting structure is still compact and versatile enough to allow for selection of any one of the ends of the heat conductive tubular element as the intake and the other as the exhaust for the second fluid steam.

The invention as broadly claimed hereinafter is concerned with a heat exchanger of the above mentioned type, which is improved in that a fluid injector is operatively connected to one of the ports of the tank to generate turbulences and prevent the formation of dead spots within the tank.

The injector is preferably in the shape of a loop and is provided with a plurality of perforations, the loop extending in a plane parallel to and near one end of the tank. Some of the perforations are oriented to generate a circulation of the first fluid in directions that are substantially perpendicular to the plane of the loop all along the length of the same. Some other perforations are oriented at angles to generate another circulation of the first fluid toward the center of the tank.

Advantageously, another fluid injector may be connected to the other port of the tank, this other injector cooperating with the injector connected to the one port to improve the generation of turbulences within the tank. This other injector may be identical to the one connected to the one port. It may also be T-shaped and provided with two opposite arms, each of these arms being perforated to force the first fluid to flow in directions perpendicular to the arms and oriented at different angles around the same.

In accordance with a preferred embodiment of the invention, the heat conductive tubular element comprises a plurality of loops-defining coils mounted within the tank of the heat exchanger in such a manner that the loops of each coil fit between the loops of at least one other adjacent coil, all of the coils having ends joined together to form common ports.

Preferably, each of the common ports extends radially through the tank near the ends thereof, and the ends of coils joining at each of the common ports project within the tank in a direction coaxial with respect to the corresponding common port, thereby avoiding the formation of dead zones within the coils or at the ends thereof.

If desired, in particular for safety reasons, each of the coils may incorporate an inner heat conductive tube in which the second fluid is circulated, this inner tube having ends also connected to the common ports.

BRIEF DESCRIPTION OF THE DRAWINGS

The invention will be better understood upon reading of the following non-restrictive description of some preferred embodiments thereof, made with reference to the accompanying drawings in which:

FIG. 4 is a top plan view of the upper portion of the coil assembly shown in FIG. 1, FIG. 5 is a cross-sectional view similar to the one of FIG. 2, showing a sickle-shaped water-distributing element.

FIG. 7 is cross-sectional view of a double-wall helicoidal coil useful in accordance with a variant of the invention, taken along line VII—VII of FIG. 4, and FIG. 8 is a cross-sectional view taken along line VIII—VIII of FIG. 4.

DESCRIPTION OF PREFERRED EMBODIMENTS

Figure 1:
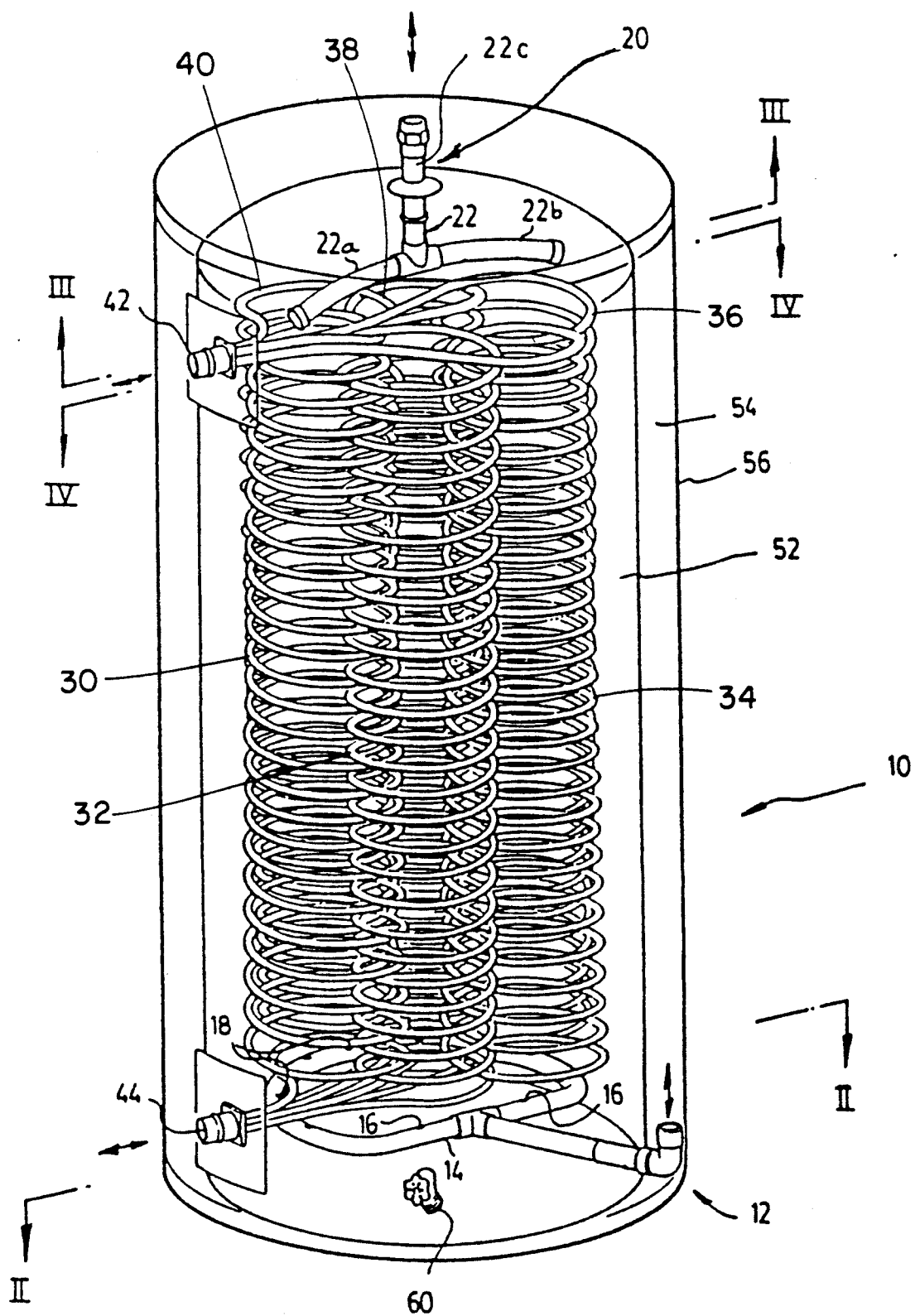
FIG. 1 is a perspective view partly in cross-section of a heat exchanger according to the invention.

The heat exchanger according to the invention as shown in FIG. 1 comprises a tank (10) through which a first fluid is circulated. The tank (10) is preferably cylindrical and provided with an inner protective lining. It can be made of steel and provided with a vitrified lining. It may have a 10 to 100 imperial gallon capacity and is preferably designed to withstand operating pressures of 150 lb/in$^2$.

The tank (10) has at one end a first port (12) for the intake or exhaust of the first fluid. This port (12) is connected to a fluid injector shaped as a tubular loop (14) extending in a plane parallel to, and near the adjacent end wall of the tank, inside the same.

Figure 2:
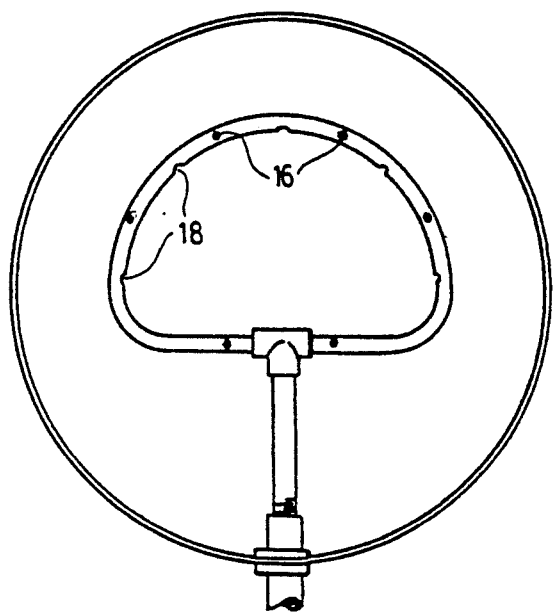
FIG. 2 is a cross-sectional view taken along line II—II of FIG. 1.

The loop-shaped injector is better shown in FIG. 2. It has a plurality of perforations (16) and (18). Some of these perforations, numbered (16), extend at regular intervals all along the length of the loop and are oriented to generate a circulation of the first fluid in directions that are substantially perpendicular to the plane in which the loop extends. This perpendicular circulation of fluid defines a circumferential flow inside the tank. The other perforations of the loop (14), numbered (18) in the drawings, are positioned between the first ones and are oriented at an angle to generate another circulation of the first fluid toward the center of the tank within the circumferential flow generated by the first set of orifices (16), thereby reducing to a considerable extent the formation of dead spots inside the tank (10).

The loop (14) needs not be closed as shown is FIGS. 1 or 2. As a matter of fact, it can be open as is shown in sickle (61) FIG. 5. This sickle shape makes the loop easily insertable into, and removable from the tank through a small hole provided in its wall. Of course, the sickle (61) must have perforations (62) and (64) that are positioned in the very same manner as those numbered (16) and (18) in FIG. 2.

The loop (14) also needs not be circular, although such a shape is preferred. As a matter of fact, it could be square, rectangular, oval or polygonal, as long as its perforations cause the first fluid to flow perpendicularly to the plane in which the loop extends, and also at angles converging toward the center of the tank, to create turbulence in the tank (10) and prevent dead spots inside the same.

Figure 3:
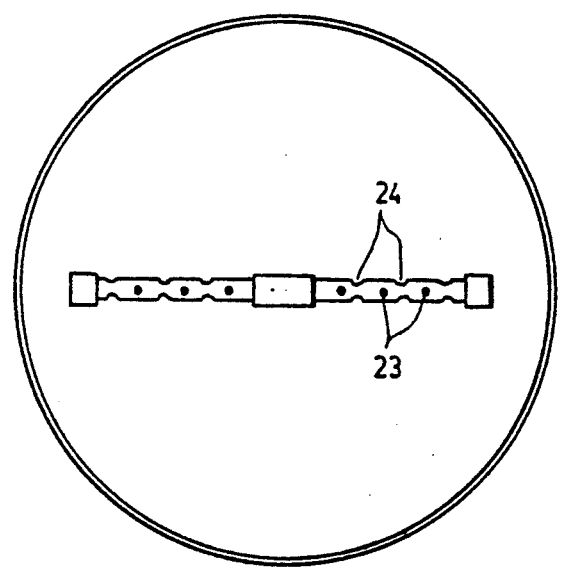
FIG. 3 is a cross-sectional view taken along line III—III of FIG. 1.

As shown in FIG. 1, the tank has another port (20) at the other end which is preferably connected to another tubular injector (22) which is preferably T-shaped and comprises two arm members (22a) and (22b) linked to a central stem member (22c). The arms (22a) and (22b), better shown in FIG. 3, are provided with perforations (23) and (24) to force the first fluid to flow in directions perpendicular to the arms and at variable angles around the same, that are preferably less than 45°, in order to obtain diverging flows moving away from or diverging toward the loop-shaped element (14).

Once again the injector (22) needs not be T-shaped. If desired, it could be replaced by a loop-shaped injector similar to the one numbered (12) and better shown in FIG. 2.

The heat exchanger according to the invention also comprises at least one heat conductive tubular element mounted within the tank (10) between the loop-shaped injector (14) and the T-shaped injector (22). As shown in FIG. 1, the heat conductive tubular element preferably consists of a coil assembly made up of a plurality of helicoidal tubes, hereinafter called coils, that are numbered (30), (32), (34), (36), (38), (40), respectively, and are mounted within the tank (10) in such a manner that the loops of each coil fit between the loops of at least one other and preferably two or more other helicoidal coils adjacent thereto, each of the coils extending between a pair of common ports (42) and (44). In this particular arrangement, the surface areas defined by the coils substantially overlap when seen in top plan view, thereby allowing the incorporation of several coils within the tank (10) even if the volume of this tank is small. Each coil is preferably made of copper, unoxidizable steel or any other material capable of allowing heat transfer and withstanding pressures of up to 100 lb/in$^2$.

The upper and lower ends of all the helicoidal coils can be joined together by means of manifolds to form the ports (42), (44), as is shown in FIG. 1. These two ports defined an inlet and an outlet respectively for a second fluid to be circulated through the coils to exchange heat with the first fluid with the tank.

Advantageously, the ports (42) and (44) extend radially through the top and bottom portions of the lateral wall of the tanks and the upper and lower ends of the coils project within the tank (10) in directions coaxial with the ports (42) and (44). This particular arrangement makes the circulation of the second fluid very smooth from the ports to the coils and avoids the formation of dead zones within the coils or at the inlet or outlet thereof. As is well known, the tank (10) containing the structural elements described above may be conveniently insulated with an insulating material (54) such as glass fibers, and mounted in another tank (56) made of enameled steel acting as an outside envelope. The tank (10) may also be provided with a draining valve (60) in its lowermost portion for draining it whenever desired.

The first and second fluids may be liquid(s) and/or vapor(s). By way of example, the heat exchanger can be used to carry out heat exchanger between first and second fluids such as water-water, water-glycol, water-steam, water-oil. When steam is used as second fluid and is fed into the helicoidal coils, the port (42) on top of the tank (10) is used as inlet for the steam whereas the port (44) at the bottom of the tank is used as an outlet for the condensate formed within the coils. Once again, it will be appreciated that the shape and positioning of the coils relative to the ports avoids the formation of dead zones and allows the condensate to flow smoothly out of the tank (10). Thus steam fed through the port (42) to heat, for example water originating from line (12), may condense in the helicoidal coils and the condensate that falls at the bottom of these coils, can be collected at (44) by pumping means while hot water is obtained from line (22c). All these steps can be carried out smoothly, thereby avoiding knocking as is often encountered in poorly designed heat-exchanger, where gas pockets are free to insidiously form in the circulating liquid.

The heat exchanger according to the invention is extremely versatile in that anyone of the ports (14) and (20) can be selected as the inlet port for the first fluid. Similarly, anyone of the ports (42) and (44) can selected as the inlet port for the second fluid. As a result, both fluids can be circulated in any direction.

The heat exchanger according to the invention also has a high efficiency as will be demonstrated from the Examples. For a tank of given capacity, the surface over which heat is exchanged, is much greater than usual because of the plurality of overlapping coils used therein. Moreover, the heat exchange is more easily controllable because of the absence of dead spots within the tank, thereby making it possible to more precisely adjust the outlet temperature of the fluid to be heated or cooled.

Figure 6:
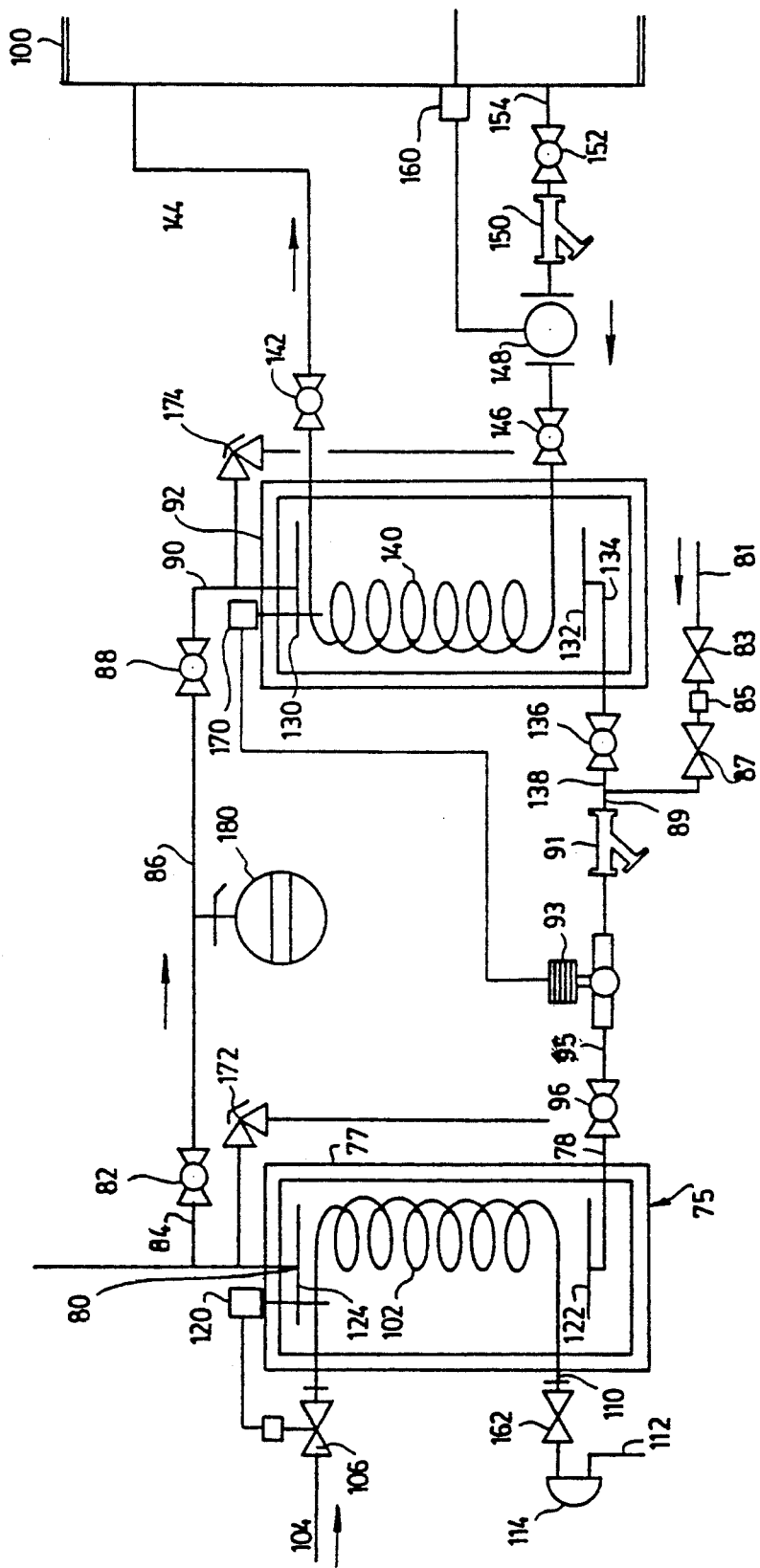
FIG. 6 is a schematic view of an indirect, steam-heated water system incorporating two heat-exchangers according to the invention.

FIG. 6 illustrates an heat exchange system using a pair of heat exchangers as disclosed hereinabove, to heat water.

More particularly, the system shown in FIG. 6 comprises a first heat exchanger (75) similar to the one previously described, comprising a tank (77) having an inlet port (78) and outlet port (80).

The tank (77) is fed with water through a main line (81) provided with a closing valve (83), a pressure reduction valve (85) and another valve (87) leading to a line (89) connected to the inlet port (78) and along which are mounted a filter (91), a circulating pump (93) and a valve (96).

The outlet port (80) is connected to a line (86) including a first valve (82) and a second valve (88). The line (86) leads to the inlet port (90) to a second heat exchanger (92) similar to the one previously disclosed and which, as will be explained later, acts as an energy pool for heating the water of an adjacent hot water reservoir (100) containing 200 gallons of water. This second heat exchanger has an outlet port (134) connected to the line (89) via a valve (136). Thus, the line (89), heat exchanger (75), line (86) and heat exchanger (92) altogether form a closed loop in which water may be circulated by the pump (93).

The tank (77) of the first heat exchanger (75) is provided with helicoidal coil(s) schematically shown at (102). These may be of the type shown in FIG. 4, as discussed above. The helicoidal coil(s) is (are) connected to a source of hot fluid such as a boiler, not shown for sake of clarity, via a line (104) provided with a control valve (106). Alternatively, the hot fluid source may be a solar energy source. However, use is preferably made of a hot fluid source in which a fluid is heated by combustion of fuel, diesel oil or coal, or with electrical energy. The heat of fluid fed in the line (104) is exchanged with the water inside the tank (77) via the helicoidal coil(s) (102). The cold fluid at the outlet (110) of the coil(s) (102) is returned to the hot fluid source via a line (112) provided with purging means (114).

The tank (77) of the first heat exchanger (75) then forms in turn a heat source which can be used to heat the water contained in the tank of the second heat exchanger (92) when this water is circulated by the pump (93) through the lines (86) and (89). The temperature of the tank (77) is maintained at a predetermined level by means of a thermostat (120) or any similar temperature sensing device operatively connected to the control valve (106) to open and close the same.

The inlet port (78) is preferably associated with a loop-shaped injector (78) that is preferably of the type numbered (14) in FIG. 1, and the outlet port (80) is preferably connected to a T-shaped injector of the type numbered (22) in FIG. 1.

Similarly, the inlet port (90) of the tank of the second heat exchange (92) is connected to a loop-shaped injector (120) whereas the outlet port (134) is connected to a T-shaped injector. Thus, the ports (130) and (132) are similar to the ports (124) and (122).

The tank of the second heat exchanger (92) is also provided with helicoidal coil(s) (140) having a common outlet connected via a valve (142) to a return line (144) leading to the hot water reservoir (100), and a common inlet connected via a valve (146) to a line (154) leading from the reservoir (100) and along which are mounted a pump (148), a filter (150) and a closing valve (152). The pump (148) is operatively controlled by a thermostat or a similar temperature sensing device measuring the temperature of the water within the reservoir (100) as shown at (160).

In use, as soon as the temperature of the water in the reservoir (100) falls under a given value because of, say, a sudden demand, the temperature sensing device (160) starts the pump (148) and thus causes the water at the bottom of the reservoir to circulate through the line (154) and then through the helicoidal coil(s) (140) mounted in the second heat exchanger (92), which thus acts as a water heater.

As soon as the temperature of the water in the tank of the second heat exchanger (92) as measured by a temperature sensing device (170) falls below a second predetermined value, the temperature sensing device (170) actuates the circulating pump (93). Thereby, the heat "stored" in the tank (77) of the first heat exchanger (75) is "transfered" into the second heat exchanger (92).

If the temperature of the water in the tank (77) as measured by the temperature sensing device (120) falls below a third predetermined value, then the valve (106) is opened to allow the hot fluid of the hot fluid source to circulate within the coil(s) in the tank (77) to heat the water contained in the same.

The high rate of heat exchange carried out in sequence as explained hereinabove enables a substantial reduction in energy consumption, as well as faster heat recovery. The energy recovered may reach 30–40% and this can be explained by the high turbulences generated by the water-distributing elements within the tanks of heat-exchangers, and the high contact surface of the coils.

The turbulences generated inside the tanks permanently cleans the helicoidal coils. Thus deposit on the coils are avoided. Also, the tendency for the coils to scale is reduced since the helicoidal coils contract and expand as a result of temperature variations within each heat exchanger.

It should be noted that the thermostats or other temperature sensing devices are preferably mounted in such a manner as to be movable up or down in the tanks to enable proper positioning and quick response to temperature variations.

Of course the tanks may also be provided with auxiliary equipment known per se, such as pressure release valves (172) and (174), as is well known, and an expansion tank (180).

The above heat exchange system can be used for instance to heat hot water, using glycol or water, or to isolate primary and secondary circuits. It can also be used, depending upon the nature of the helicoidal coil(s) and tanks, to heat or cool various liquids such as thermal oils, glycol, brine, and acidic substances.

The system permits accumulation of a high amount of energy and is subject to few losses due to radiation.

As shown in FIGS. 4, 7 and 8, each of the helicoidal coils (30), (32), (34), (36), (38), (40) may be used as a lining for an inner heat conductive tube (240). Thanks to the planar arrangement of the inlet and outlet of the helicoidal coils and the continuous and regular helicoidal shape, free from sharp edges, of the ends of these helicoidal coils, the inner tube (240) can be easily inserted in the inner heat conductive tubes (240).

The inner tubes may pass through and be hermetically fixed to a sealing plate (200). This plate (200) is itself sealed inside of a larger tube (204). The outer coils (30), (32), (34), (36), (38) and (40) are themselves passing through another plate (208) to which they are sealably fixed. The plate (208) is sealably mounted inside of the larger tube (204). Thus, the larger tube (204) defines an hermetic room between the plates (208) and (200). This hermetic room may be connected to a leak sensing device (220) via a line (222), and the sensing device (220) to an alarm (226) or other devices as desired, so that if any leak is detected between the inner and the outer walls of the helicoidal tubes, an alarm or another signal is given, indicating this leak in the system.

The following example will illustrate the advantages of the preferred embodiments of the invention as described hereinabove.

EXAMPLE

A heat exchanger as shown in FIG. 1 was constructed, with five helicoidal coils, each being 60 feet long. The heat exchanger was connected to a furnace producing hot water that was introduced via the port (12) at 195° F. The water leaving the tank via the port (22c) was at 185° F. Another stream of cold water was fed into the five helicoidal coils. This water was at 36° F. when it entered the coils and at 185° F. at the ends of the same.

A 3000 gallon reservoir was heated by this heat exchanger. As soon as there was a water demand, water through the reservoir was circulated in the heat exchanger and the target temperature was instantaneously. By way of comparison normally, a 3000 gallons reservoir like those used in condominiums has to be heated during a period of 8 to 9 hours after the peak period before again reaching its target temperature.

Moreover, tests carried out with and without the use of water-distributing injectors (14) and (22) within the tank, have proved that without these elements the water at the outlet of the helicoidal tubes had sudden temperatures variations of 20° to 25° F. due to dead spots or gradient temperatures within the tank.

In the above specification, the word "injector" has been used indifferently to designate the water distributing, members connected to the inlet and outlet ports of the heat exchanger tank. It may be understood however that only the member connected to the inlet port really as an "injector", the other member at the outlet port being rather a "sucking device" although its also participates to the formation of dead-spots preventing tubulences within the tank. The same word "injector" has nevertheless be used to identify this other member for the purpose of simplicity.

Although the present invention has been explained hereinabove by way of preferred embodiments thereof, it should be pointed out that any modifications to these preferred embodiments, within the scope of the appended claims, is not deemed to change or alter the nature and scope of the invention.

What is claimed is:

1. A heat exchanger comprising:
   a tank in which a first fluid may be circulated, said tank having opposed ends and an inlet port and an outlet port for said first fluid; and
   at least one heat conductive tubular element located within said tank, in which a second fluid may be circulated in order to exchange heat with the first fluid within the tank, said at least one heat conductive element having ends leading outside said tank;
   wherein a fluid injector is operatively connected to one of the ports of the tank to generate turbulences and to prevent the formation of dead spots within the tank;
   wherein said injector is in the shape of a loop and is provided with a plurality of perforations, said loop extending in a plane parallel to and near one end of said tank, some of said perforations being oriented so as to generate a circulation of said first fluid in directions that are substantially perpendicular to the plane of said loop all along the length of said loop, some other perforations being oriented at angles so as to generate another circulation of said first fluid toward a central position of the tank.

2. The improved heat exchanger as defined in claim 1, wherein said tank is cylindrical and said injector is located near and parallel to one of said opposed ends.

3. The improved heat exchanger as defined in claim 2, wherein said loop is a closed loop.

4. The improved heat exchanger of claim 2, wherein said loop is open and the injector is thus shaped as a sickle.

5. The improved heat exchanger of claim 2, wherein another fluid injector is connected to the other port of said tank, said other injector cooperating with said injector connected to said one port to improve the generation of turbulences within the tank.

6. The improved heat exchanger of claim 2, wherein said other injector connected to said other port is identical to the injector connected to the one port and located near and parallel to the other end of said tank.

7. The improved heat exchanger of claim 2, wherein said other injector connected to said other port is T-shaped and provided with two opposite arms, each of said arms being perforated to force the first fluid to flow in directions perpendicular to said arms and oriented at different angles around the same.

8. A heat exchanger comprising:
   a tank in which a first fluid may be circulated, said tank having opposed ends and an inlet port and an outlet port for said first fluid; and
   at least one heat conductive tubular element located within said tank, in which a second fluid may be circulated in order to exchange heat with the first fluid within the tank, said at least one heat conductive element having ends leading outside said tank;
   wherein a fluid injector is operatively connected to one of the ports of the tank to generate turbulences and to prevent the formation of dead spots within the tank;
   wherein said at least one heat conductive tubular element comprises a plurality of loop-defining coils mounted within said tank of said heat exchanger in such a manner that the loops of each coil fit between the loops of at least one other adjacent coil, all of said coils having ends joined together to form common ports.

9. The improved heat exchanger of claim 1, wherein said at least one heat conductive tubular element comprises a plurality of loop-defining coils mounted within said tank of said heat exchanger in such a manner that the loops of each coil fit between the loops of at least one other adjacent coil, all of said coils having ends joined together to form common ports.

10. The improved heat exchanger of claim 6, wherein said at least one heat conductive tubular element comprises a plurality of loops-defining coils mounted within said tank of said heat exchanger in such a manner that the loops of each coil fit between the loops of at least one other adjacent coil, all of said coils having ends joined together to form common ports.

11. The improved heat exchanger of claim 7, wherein said at least one heat conductive tubular element comprises a plurality of loop-defining coils mounted within said tank of said heat exchanger in such a manner that the loops of each coil fit between the loops of at least one other adjacent coil, all of said coils having ends joined together to form common ports.

12. The improved heat exchanger of claim 8, wherein at each of the ends of coils joining at each of said common ports project within the tank in a direction coaxial with respect to said common ports, thereby avoiding the formation of dead zones within the coils or at the ends thereof.

13. The improved heat exchanger of claim 9, wherein the ends of coils joining at each of said common ports project within the tank in a direction coaxial with respect to said common ports, thereby avoiding the formation of dead zones within the coils or at the ends thereof.

14. The improved heat exchanger of claim 10, wherein at each of the ends of coils joining at each of said common ports project within the tank in a direction coaxial with respect to said common ports, thereby avoiding the formation of dead zones within the coils or at the ends thereof.

15. The improved heat exchanger of claim 11, wherein at each of the ends of coils joining at each of said common ports project within the tank in a direction coaxial with respect to said common ports, thereby avoiding the formation of dead zones within the coils or at the ends thereof.

16. The improved heat exchanger of claim 12, wherein each of said coils incorporates an inner heat conductive tube in which said second fluid is circulated, said inner tube having ends also connected to said common ports.

17. The improved heat exchanger of claim 13, wherein each of said coils incorporates an inner heat conductive tube in which said second fluid is circulated, said inner tube having ends also connected to said common ports.

18. The improved heat exchanger of claim 14, wherein each of said coils incorporates an inner heat conductive tube in which said second fluid is circulated, said inner tube having ends also connected to said common ports.

19. The improved heat exchanger of claim 15, wherein each of said coils incorporates an inner heat conductive tube in which said second fluid is circulated, said inner tube having ends also connected to said common ports.

* * * * *